(No Model.)
W. L. MONTAGUE, Jr. & E. S. LEA.
SHAFT COUPLING.
No. 457,209.  Patented Aug. 4, 1891.
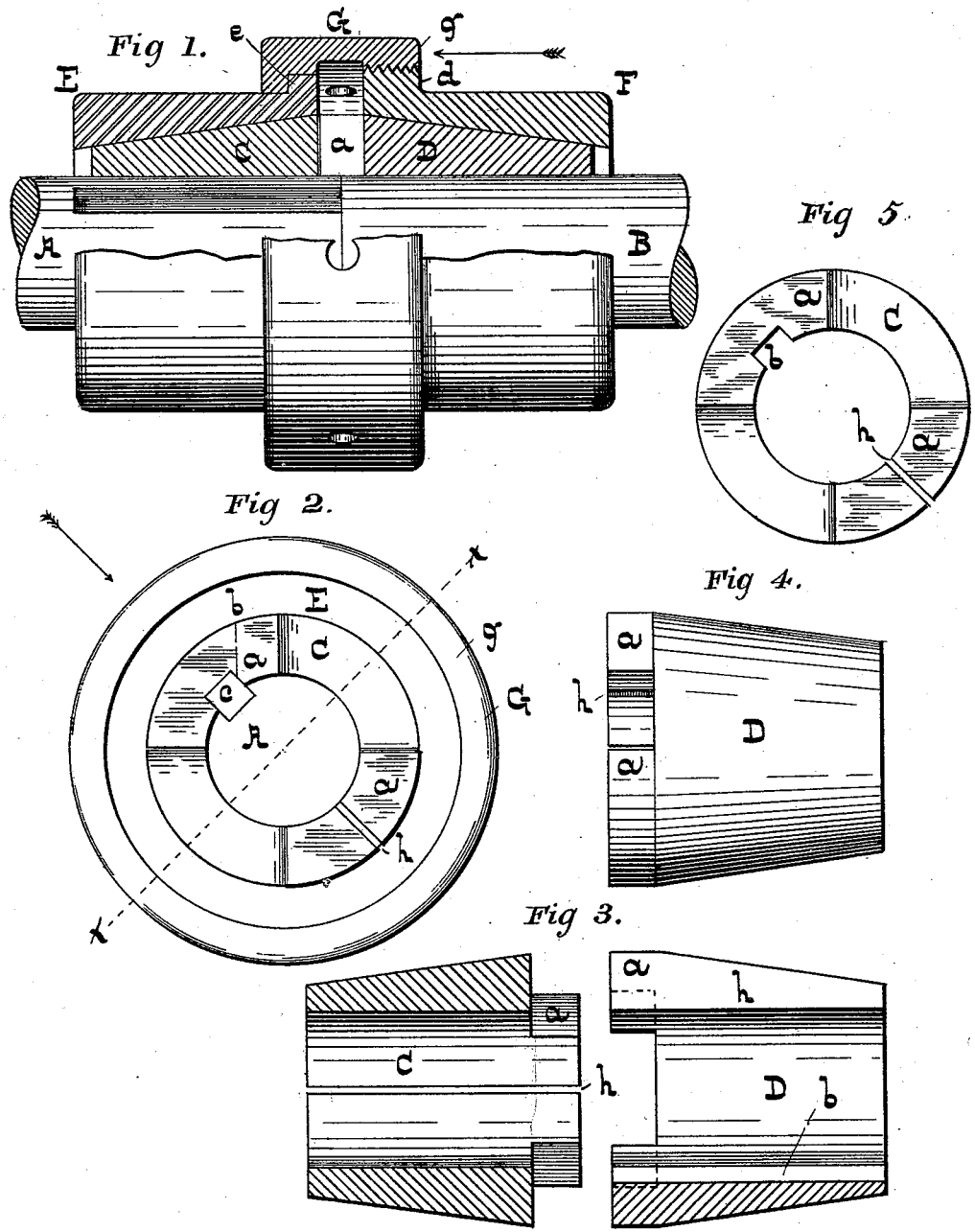
WITNESSES
Dan'l Fisher
H. C. Landis
INVENTORS
William L. Montague Jr
Edward S. Lea

UNITED STATES PATENT OFFICE.

WILLIAM L. MONTAGUE, JR., AND EDWARD S. LEA, OF BALTIMORE, MARYLAND.

SHAFT-COUPLING.

SPECIFICATION forming part of Letters Patent No. 457,209, dated August 4, 1891.

Application filed January 21, 1891. Serial No. 378,543. (No model.)

*To all whom it may concern:*

Be it known that we, WILLIAM L. MONTAGUE, Jr., and EDWARD S. LEA, both of the city of Baltimore, in the State of Maryland, have invented certain Improvements in Shaft-Couplings, of which the following is a specification.

In the description of the said invention which follows reference is made to the accompanying drawings, forming a part hereof, and in which—

Figure 1 is a side view of the adjoining ends of two shafts secured together by means of the coupling which forms the subject of the present invention and which is shown partly in section. Fig. 2 is an end view of the same with the shaft to the right and its portion of the coupling removed and looking in the direction indicated by the arrow in Fig. 1. Figs. 3, 4, and 5 are details of the invention hereinafter described.

Similar letters of reference indicate similar parts in all the figures.

Referring to the drawings, A and B are the two shafts to be coupled, and C and D split conical shells bored out to fit tightly the shafts upon which they are respectively placed with their larger ends facing each other. The faces of the conical shells have segmental projections $a$, which interlock, as in a clutch. The shells C and D have key-seats $b$, and the shafts are provided with feathers or keys $c$, which rest in the said seats.

Fig. 3 is a longitudinal section of the two shells with their clutch ends separated, taken on the dotted line $x\ x$, Fig. 2, and looking in the direction indicated by the arrow in that figure.

Fig. 4 is an exterior side view of the shell D, and Fig. 5 is a face view of the shell C.

E and F are coupling-sleeves, the latter having a threaded flange $d$ and the former a plain flange $e$, and G is a nut bored out to fit the body and flange of the sleeve E. The overhanging part $g$ of the nut G is threaded, so as to admit of its union with the screw-flange.

The slots which admit of the shells being compressed on the shafts are denoted by $h$.

To couple shafts already in position in their hangers, the shafts are separated endwise, so as to admit of the application to their ends of the conical shells and the nut which is on the sleeve C. The shafts are then brought together and the nut G screwed over the threaded flange $d$. In this operation the conical sleeves draw the conical shells together, and at the same time compress them on the shafts. The feathers serve to complete the fastening of the shells on the shafts, and the motion of the driving-shaft is communicated to the driven one through the medium of the clutch projections and the feathers.

From the foregoing description it will be seen that in this invention friction between the conical shells and the shafts is not depended upon to effect the drive, neither is the nut subjected to any strain, except that required to draw the shells tightly together and accurately center the shafts, but instead the driving is done as in ordinary solid couplings, the coupling-nut performing the function of the bolts used in such couplings.

We claim as our invention—

1. In a shaft-coupling, the combination of two split conical shells having interlocking faces, two conical sleeves which fit over the said shells, and a securing-nut, substantially as specified.

2. In a shaft-coupling, a pair of conical shells having clutch-faces, combined with a pair of conical sleeves adapted to fit over the said shells, the said sleeves being united by means of a nut, substantially as specified.

WILLIAM L. MONTAGUE, JR.
EDWARD S. LEA.

Witnesses:
WM. T. HOWARD,
DANL. FISHER.